Jan. 24, 1967   F. DEUTSCH   3,300,744
BRAKING DEVICE FOR HIGH VELOCITY CONDUCTIVE MEMBERS
IN DIVIDING AXIALLY SPACED OPPOSED ADJACENT
MAGNETIC FIELDS
Filed Jan. 12, 1965
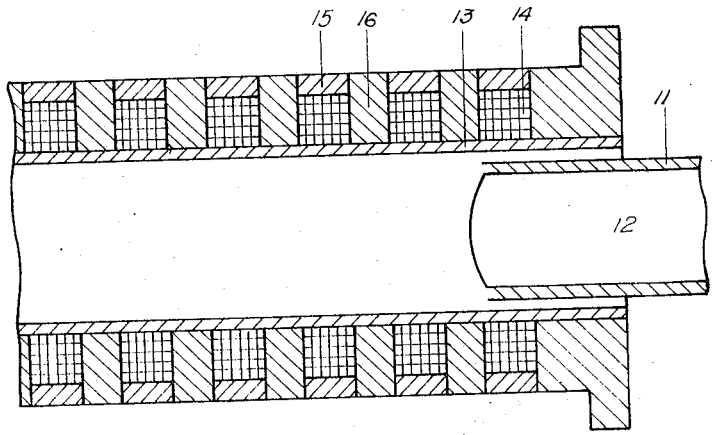
INVENTOR
Felix Deutsch
BY Tourover & Browdy
ATTORNEYS

United States Patent Office 3,300,744
Patented Jan. 24, 1967

3,300,744
BRAKING DEVICE FOR HIGH VELOCITY CONDUCTIVE MEMBERS IN DIVIDING AXIALLY SPACED OPPOSED ADJACENT MAGNETIC FIELDS
Felix Deutsch, Jerusalem, Israel, assignor to Yissum Research Development Company, Jerusalem, Israel, a company of Israel
Filed Jan. 12, 1965, Ser. No. 424,967
Claims priority, application Israel, Apr. 24, 1964, 21,245
5 Claims. (Cl. 335—268)

The present invention relates to a novel electromagnetic brake. The brake according to the invention was designed for use in a device for creating and studying a plasma originating from an arc at low pressure, but brakes according to the present invention are of value for other applications as well.

The brake according to the invention consists in combination of a number of coils located on a stationary tube and means for passing current through these coils in such manner that the current passing through consecutive coils will flow in opposite directions, and a tubular metallic member mounted on the member will be braked and means for actuating at a predetermined moment the flow of current through the coils.

Due to the flow of current through the coils a radial magnetic field is set up and this field induces currents in the tubular member attached to the member to be braked, setting up a force in a direction opposite to the direction of movement of the moving member. The reduction of velocity of the moving member is proportional to the distance traversed inside the brake and to the square of the magnetic flux density.

The novel device was developed as other mechanical braking devices proved unsatisfactory and resulted in frequent time-consuming repairs. These drawbacks were overcome by the novel device which gave entirely satisfactory results.

In the following device according to the invention is described by way of example with reference to the enclosed schematical drawing which is an axial drawing, in section, of the brake.

The device according to the invention, as illustrated in the drawing, consists of a tubular member 11 mounted on and rigidly connected with the member 12 to be braked. The external diameter of the tubular member 11, which must be made of a material having a high electric conductivity, is slightly smaller than the inner diameter of the tube 13, which may be of a metal such as brass. On this tube 13 there are positioned the windings of the magnetic field coil 14, the connections of which are arranged in such a manner that the current flowing in consecutive coils flows in opposite directions. In order to amplify the magnetic field at points of importance for the performance of the brake, the lines of force are short-circuited by means of rings 15 of mild steel positioned around, and such rings 16, positioned between the coils.

A device according to the invention was built from a brass tube of inner diameter of 44 mm., outer diameter 47 mm., each of the coils consisted of 160 turns of 0.75 mm. diameter insulated copper wire and there was provided 56 such coils every 16 mm. along the brass tube.

The number to be braked was provided with a sheath consisting of an aluminium tube of 43.5 mm. external diameter, 3.0 mm. wall thickness and 25.0 cm. length. The mass of this member and aluminium tube together was 450 g.

The reduction of velocity of the member to be braked is proportional to the distance traversed inside the brake and the square of the magnetic flux density. The flow of current through the coils results in a strong magnetic field which is symmetrical respective to the axis of the device and which has a strong radial component between adjacent coils and near the inner wall of the tube 13. The direction of the magnetic lines of force is reversed between consecutive coils. The tubular member ensheathing the member to be braked, made of an electrically conducting material such as aluminum, can be thought of as a plurality of short-circuited rings. Each ring when passing through the region between two adjacent coils, cuts the lines of force of the magnetic field, inducing an electromotive force which produces a large current in the short-circuited ring. The magnetic field due to this induced electric current interacts with the magnetic field set up by the current through the coils and at every instance the interaction between these fields is such as to oppose the motion of the moving member. This is due to the fact that the direction of induced current is reversed when the short-circuited ring passes through a consecutive gap and also at this instance the direction of the magnetic interaction will tend to brake the moving member. The total braking force is the integral of the forces of the short-circuited elements along the length of the tubular member which is braked and the length of the tube of the brake.

By way of example, there was shot into a device, as described above, a projectile encased in a suitable tube, of total mass of 450 g. The projectile entered the brake at a maximum velocity of 45 m./sec. A current of 20 A. was switched on just before the projectile entered the brake and was switched off one second later. After passing a length of 90 cm., and while still in the tube of the brake, the projectile came to a standstill.

It is clear that projectiles with greater velocities and larger mass can be braked in similar devices of greater length or higher current strength.

It is clear that the above description has been given by way of example only and that many variations of the design and arrangement of parts may be resorted to without departing from the spirit and scope of the invention.

Braking devices according to the invention can be used in conjunction with various machine elements and for other purposes.

I claim:
1. A device for braking members moving at a high linear velocity, comprising:
    a tubular member having an axial passage for defining a path of travel for an electrically conductive member to move therethrough:
    electro-magnetic means on said tubular member in spaced relation axially therealong for creating adjacent reserved magnetic fields; and
    means for simultaneously energizing said adjacent electro magnetic means whereby the direction of current flow through consecutive electro magnet means is in opposite directions and adjacent reversed magnetic fields are produced for braking the velocity of an electrically conductive member moving through said passage.

2. A device as claimed in claim 1 in which said electro magnetic means comprises coils of reversely wound wire.

3. A device as claimed in claim 1 including ferrous elements circumposed about said electromagnetic means.

4. A device as claimed in claim 1 including ferrous elements circumposed about said tubular member between adjacent electro-magnetic means.

5. A device as claimed in claim 4 including ferrous elements circumposed about said electro-magnetic means.

References Cited by the Examiner
UNITED STATES PATENTS

| | | | |
|---|---|---|---|
| 1,909,470 | 5/1933 | Jacobson | 310—14 |
| 2,803,761 | 8/1957 | Young | 310—14 |
| 2,870,675 | 1/1959 | Salisbury | 310—14 X |

BERNARD A. GILHEANY, *Primary Examiner.*

H. A. LEWITTER, *Assistant Examiner.*